(12) United States Patent
Hösel et al.

(10) Patent No.: US 7,730,590 B2
(45) Date of Patent: Jun. 8, 2010

(54) APPARATUS AT A SPINNING PREPARATION MACHINE HAVING AT LEAST ONE ELECTRIC MOTOR-DRIVEN ROLLER

(75) Inventors: Fritz Hösel, Mönchengladbach (DE); Dieter Wirtz, Erkelenz (DE)

(73) Assignee: Truetzschler GmbH & Co. KG, Moenchengladbach (DE)

( * ) Notice: Subject to any disclaimer, the term of this patent is extended or adjusted under 35 U.S.C. 154(b) by 925 days.

(21) Appl. No.: 11/525,030

(22) Filed: Sep. 22, 2006

(65) Prior Publication Data

US 2007/0079479 A1 Apr. 12, 2007

(30) Foreign Application Priority Data

Oct. 7, 2005 (DE) .................. 10 2005 048 487

(51) Int. Cl.
*D01G 15/12* (2006.01)
(52) U.S. Cl. .............................. 19/98; 19/112
(58) Field of Classification Search ............. 19/98, 19/112
See application file for complete search history.

(56) References Cited

U.S. PATENT DOCUMENTS

| 5,521,477 A | 5/1996 | Sasaki |
| 6,256,597 B1 | 7/2001 | Wang et al. |

FOREIGN PATENT DOCUMENTS

| DE | 2822712 A1 | 12/1978 |
| DE | 3507242 A1 | 11/1985 |
| DE | 19520330 A1 | 12/1996 |
| DE | 196 26 459 A1 | 1/1998 |
| DE | 19806258 A1 | 8/1998 |
| DE | 19902315 A1 | 1/1999 |
| GB | 0399827 A | 4/1932 |
| GB | 1362645 A | 2/1973 |
| GB | 1381583 A | 4/1973 |
| GB | 1580604 A | 5/1978 |
| JP | 53 136263 | 11/1978 |
| JP | 58156031 A | 9/1983 |
| SU | 1810407 A1 | 2/1991 |
| WO | WO 98/00766 | 1/1998 |

OTHER PUBLICATIONS

"Prototype Integrated Robotic Painting System: Software and Hardware Development," Suk-Hwan Suh, et al., *Journal of Manufacturing Systems*, 12, No. 6, pp. 463-473, 1993.
European Patent Office Search Report for European Application No. 03079134.7-1239.
British Search Report, dated Jan. 31, 2007, based on Counterpart British Application No. GB 0619699.2.
German Search Report dated Mar. 31, 2006, issued in, DE 10 2005 048 487.5.

*Primary Examiner*—Shaun R Hurley
(74) *Attorney, Agent, or Firm*—Venable LLP; Robert Kinberg; Leigh D. Thelen (57) ABSTRACT

In an apparatus at a spinning preparation machine, especially at a carding machine, cleaner, draw frame, combing machine or the like, having at least one electric motor-driven roller, which is rotatably mounted about its longitudinal axis, the roller is caused to rotate by means of forces of an electromagnetic field that act on at least one roller end-face. In order to achieve a substantially increased drive output and braking output and a high torque in a simple manner, an electromotive drive means is present having a rotor and a stator which are integrated into the roller and into an immobile machine element associated with the roller.

18 Claims, 7 Drawing Sheets

III-III

APPARATUS AT A SPINNING PREPARATION MACHINE HAVING AT LEAST ONE ELECTRIC MOTOR-DRIVEN ROLLER

CROSS REFERENCE TO RELATED APPLICATION

The present application claims priority from German Patent Application No. 10 2005 048 487.5 dated Oct. 7, 2005, the entire disclosure of which is incorporated herein by reference.

BACKGROUND OF THE INVENTION

The invention relates to an apparatus at a spinning preparation machine, especially at a carding machine, cleaner, draw frame, combing machine or the like, having at least one electric motor-driven roller.

In a known apparatus (DE 28 22 712 A), a cylinder drive is provided for a textile machine, especially for a carding machine. The drive has a ferromagnetic, conductive annular plate which is arranged "at least one end face of the cylinder". The annular plate lies opposite to an asynchronous linear motor. That motor is evidently rotatably (inclinably) mounted in relation to the perpendicular axis of the cylinder. A change in the speed of the cylinder is said to be effected in dependence on the inclination or the "angle of inclination ø". "Regulation of the speed of the cylinder" is also said to be possible by that means. A disadvantage is that, in order to effect a control, a means is required for the automatic adjustment or deplacement of the motors, since a change in speed is possible only by altering the angle of inclination of the linear motors. Also necessary, in addition, are means for ascertaining the actual speed, as well as a corresponding controlling and regulating device. Especially disadvantageous is the fact that one or even two "linear motors" are not capable of applying the necessary very high output and the implicitly required torgue. A problem especially is that electric coils are present only in the region of the linear motors.

It is an aim of the invention to provide an apparatus of the type described at the outset that avoids or mitigates the mentioned disadvantages, that especially enables a substantially increased output and a torque and that allows an adjustment or alteration of the speed.

SUMMARY OF THE INVENTION

The invention provides an apparatus at a spinning preparation machine having at least one electric motor-driven roller and at least one immobile machine element associated with a said roller, comprising an electromotive drive device for driving said roller and having as first and second drive components a rotor and a stator, in which one of said first and second drive components is incorporated in said roller and the other of said first and second drive components is incorporated in said immobile machine element associated with said roller.

The features according to the invention are able to bring about, in simple manner, a substantially increased drive output and braking output and a high torque. A further advantage is that the drive can very easily be changed in speed or provided with a speed control means, for example by means of a frequency converter.

The motor driving the cylinder may be directly integrated into the side panel of the cylinder and into the cylinder itself. In such an arrangement the stationary side panel is, inter alia, the stator, and the cylinder is the rotor of the drive motor. The motor function is effected by permanent magnets being applied to the inside of the cylinder casing and by coil bodies, on which coils have been wound, being attached to the side panel. All of the coils are properly connected to one another and then connected to a control system. The control system drives a current through the individual coils in such a manner that a rotary field is formed which causes the cylinder to rotate about its axis.

The rotor may be integrated into the roller and the stator integrated into the immobile machine element. The stator may be integrated into the roller and the rotor integrated into the immobile machine element.

Advantageously, the immobile machine element is a side panel. Advantageously, there is a clearance between the roller end-face and the side panel. Advantageously, the rotor of an electric motor is joined directly to the cylinder and the stator thereof is joined directly to the stationary side panel. Advantageously, the electric motor driving the working component is on the one hand integrated directly into the component to be driven and on the other hand into the side panel carrying the component. Advantageously, the driving electric motor is integrated into an element connected to the electric motor. Advantageously, the electric motor driving the working component consists of a plate, which is joined to the component to be driven or to the shaft thereof and on which there are mounted the permanent magnets of the motor, and of the side panel, which carries the component and on which electric coils are fastened.

The permanent magnets belonging to the drive motor may be mounted on the inside of the cylinder casing. The permanent magnets belonging to the drive motor may be mounted at the end wall of the cylinder. The permanent magnets belonging to the drive motor may be mounted at a plate or the like which is joined directly to the working component or to the shaft thereof. Advantageously, the electric coils belonging to the drive motor are mounted at the side panel carrying the working component. Advantageously, the drive motor is operated with a frequency converter. Advantageously, the electromotive drive means is used as an electromotive braking means. Advantageously, the rotor of the electric motor is joined directly to the cylinder and the stator of the electric motor is joined directly to the immobile side panel. Advantageously, an electric drive and/or braking means is directly associated with the roller and the machine frame. Advantageously, the drive and/or braking means is integrated into rotating components of the roller and into the immobile machine frame. Advantageously, the electric motor and the linear motor have a stator and a rotor. Advantageously, a coil system consisting of a plurality of coils is used. Advantageously, a magnet system consisting of a plurality of magnets is used. Advantageously, the magnets are permanent magnets. Advantageously, a magnetic rotary field is present. Advantageously, a rotary field is generated in the coils for the purpose of reducing speed by braking. Advantageously, during braking, alternating voltages are formed in the coils. Advantageously, a switching device from the drive means to the braking means and vice versa is provided. Advantageously, the electric motor is an asynchronous motor. Advantageously, the electric motor is a brushless motor.

The invention also provides an apparatus at a spinning preparation machine, especially at a carding machine cleaner, draw frame, combing machine or the like, having at least one electric motor-driven roller, which is rotatably mounted about its longitudinal axis, in which apparatus the roller is caused to rotate by means of forces of an electro-magnetic field that act on at least one roller end-face, in which there is present an electromotive drive means with a rotor and a stator which are integrated, respectively, into the roller or into an immobile machine element associated with the roller.

BRIEF DESCRIPTION OF THE DRAWINGS

FIG. 4b is a section II-II through the cylinder according to FIG. 4a;

FIG. 9b is a side view according to section III-III of the arrangement according to FIG. 9a.

DETAILED DESCRIPTION OF CERTAIN PREFERRED EMBODIMENTS

Figure 1:
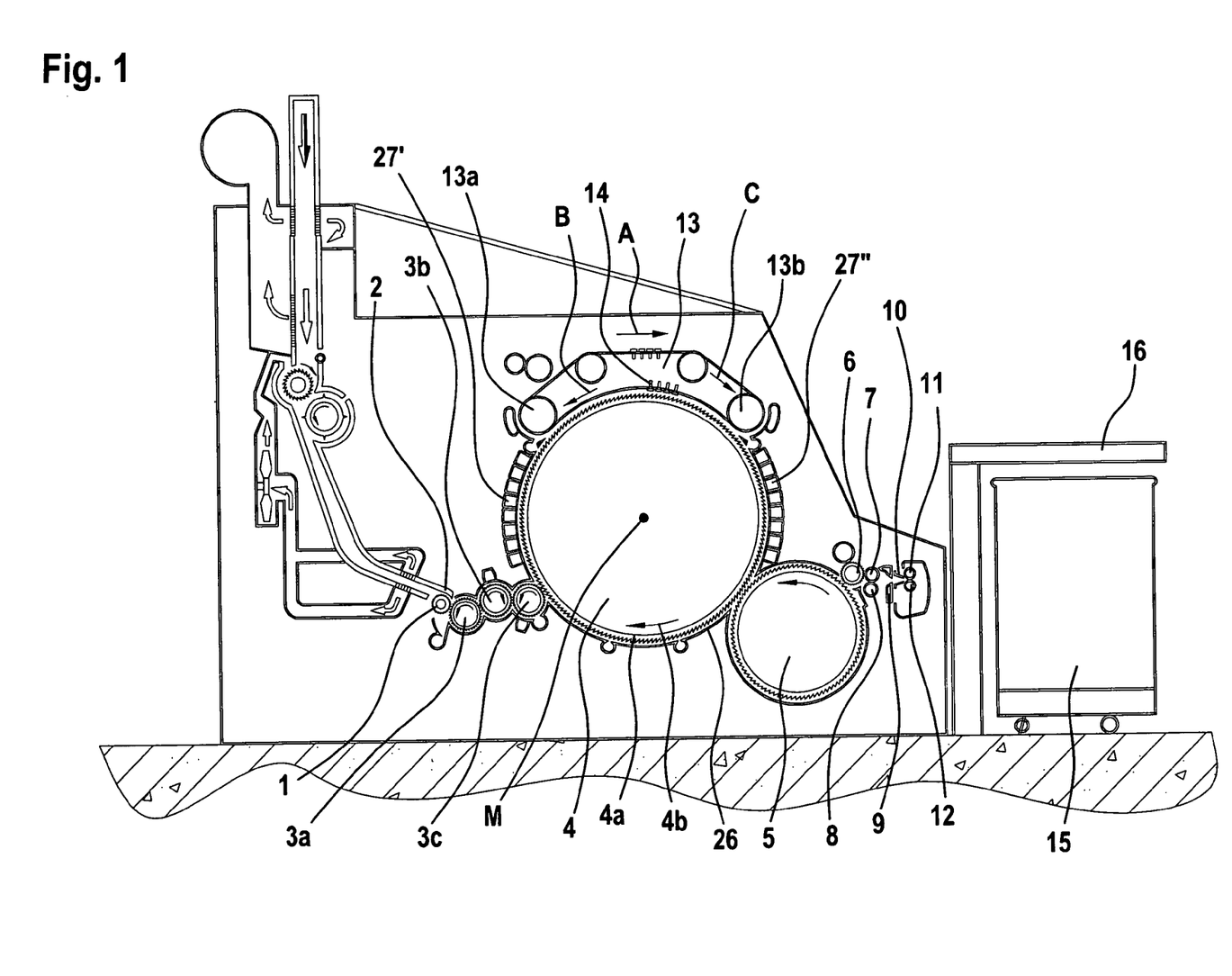
FIG. 1 is a diagrammatic side view, in section, of a flat card having the apparatus according to the invention.

FIG. 1 shows a flat card, for example a TC 03 (Trademark) flat card made by Trützschler GmbH & Co. KG of Mönchengladbach, Germany, having a feed roller 1, feed table 2, lickers-in 3a, 3b, 3c, cylinder 4, doffer 5, stripper roller 6, nip rollers 7, 8, web-guiding element 9, web funnel 10, delivery rollers 11, 12, revolving card top 13 having card top guide rollers 13a, 13b and flats 14, can 15 and can coiler 16. The directions of rotation of the rollers are indicated by curved arrows. Reference letter M denotes the centre (axis) of the cylinder 4. Reference numeral 4a denotes the clothing and reference numeral 4b the direction of rotation of the cylinder 4. Reference letter B denotes the direction of rotation of the revolving card top 13 in the carding position and reference letter C denotes the return transport direction of the flats 14; reference numerals 27', 27" denote fixed carding elements and reference numeral 26 denotes a cover underneath the cylinder 4. The arrow A indicates the working direction.

Figure 2:
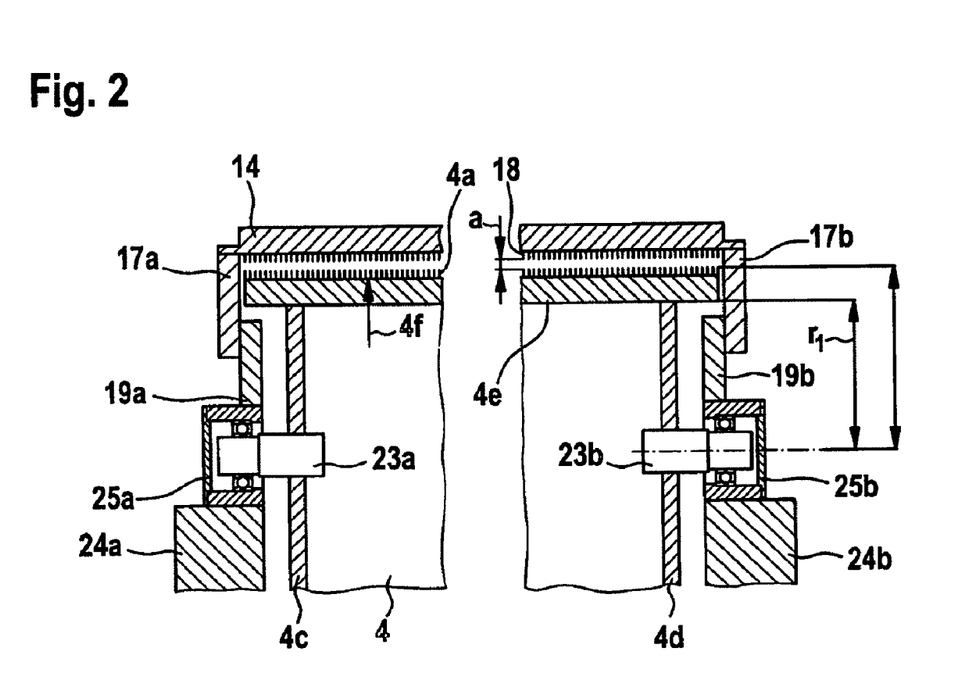
FIG. 2 is a partial section through the flat card according to FIG. 1.

FIG. 2 shows a portion of the cylinder 4 with a cylindrical surface 4f of the casing 4e and with cylinder ends 4c, 4d (radial support elements). The surface 4f is provided with a clothing 4a which, in this example, is provided in the form of wire with saw teeth. The saw-tooth wire is mounted on the cylinder 4, that is to say it is wound between side flanges (not shown) in closely juxtaposed windings to form a cylindrical working surface equipped with tips. Fibres are to be processed as uniformly as possible on the working surface (clothing). The carding is accomplished between the opposite-lying clothings 18 and 4a. It is appreciably affected by the position of one clothing in relation to the other and by the clothing spacing "a" between the tips of the teeth of the two clothings 18 and 4a. The working width of the cylinder 4 forms the basis for all other working elements of the flat card, especially for the revolving card top 14 or fixed card top 27', 27" (FIG. 1), which, together with the cylinder 4, card the fibres uniformly over the whole of the working width. In order to be able to achieve uniform carding over the whole of the working width, the settings of the working elements (including additional elements) need to be maintained over that working width. The cylinder 4 itself may, however, become deformed as a result of the clothing wire's being drawn on, as a result of centrifugal force or as a result of heating caused by the carding process. The shaft journals 23a, 23b of the cylinder 4 are mounted in bearings 25a, 25b, which are mounted on the immobile machine frame 24a, 24b. The diameter, for example 1250 mm, of the cylindrical surface 4f, that is to say twice the radius $r_1$, is an important dimension of the machine. The side panels 19a, 19b are fastened onto the two machine frames 24a and 24b, respectively. Fastened to the side panels 19a, 19b are the flexible bends 17a and 17b, respectively. The circumferential speed of the cylinder 4 is, for example, 35 m/sec.

Figure 3:
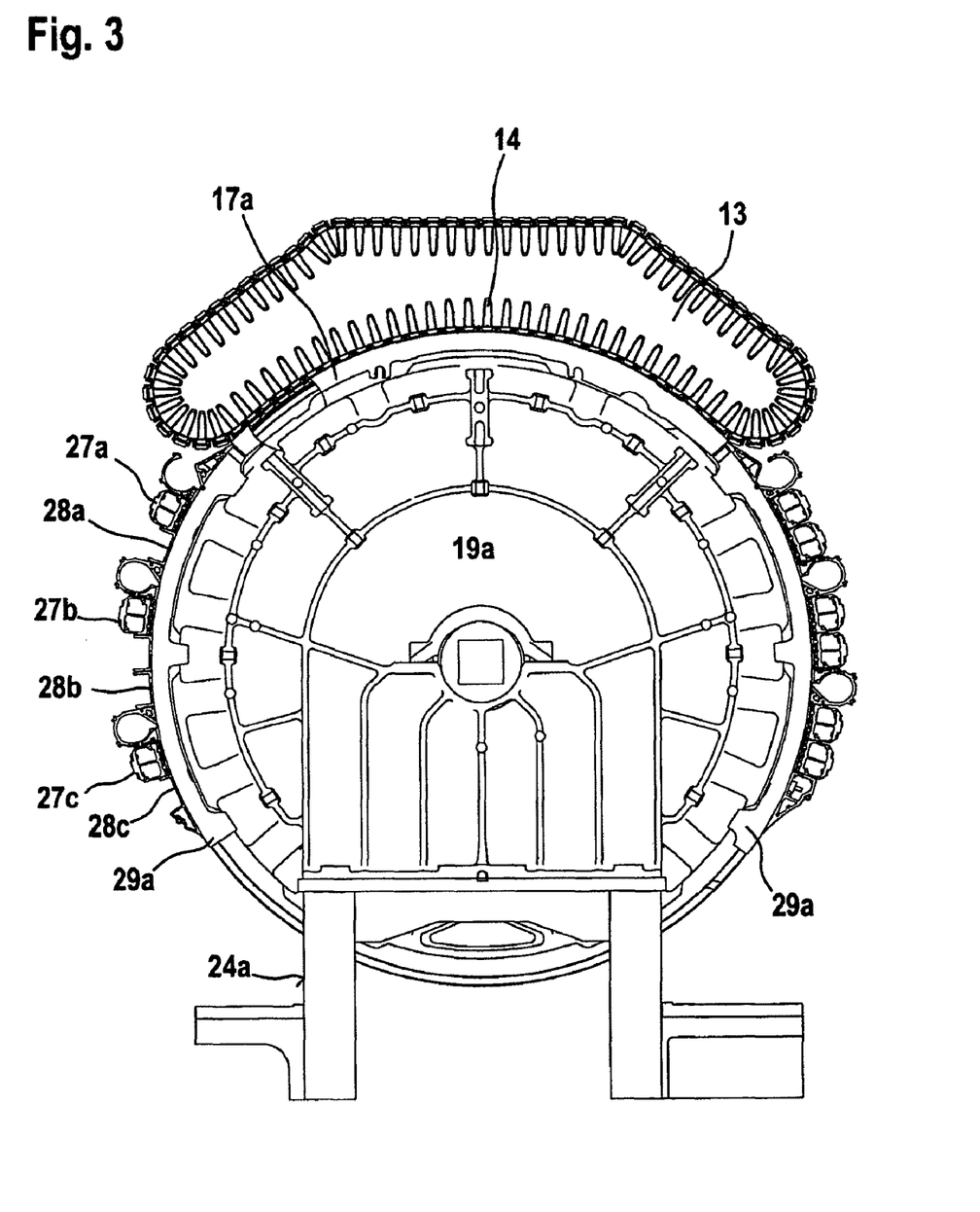
FIG. 3 is a side view of an immobile side panel, of a portion of the machine frame and of the revolving card top of the flat card according to FIG. 1.

According to FIG. 3, between lickers-in 3 and card top guide roller 13a there are three immobile fixed carding elements 27a, 27b 27c and non-clothed cylinder casing elements 28a, 28b, 28c. The fixed carding elements 27 have a clothing that lies opposite to the cylinder clothing 4a. The fixed carding elements 27a to 27c are attached by way of screws and the cover elements 28a to 28c are attached by way of screws (not shown) to an extension bend 29a (in FIG. 3, only the extension bend 29a on one side of the flat card is shown), which in turn is fastened by way of screws onto the flat card panel 19a and 19b (in FIG. 3, only 19a is shown) on each side of the flat card. The flexible bends 17a, 17b (in FIG. 3 only 17a is shown) are fastened by way of screws to the side panels 19a and 19b, respectively. Reference numeral 24a denotes the machine frame.

Figure 4A:
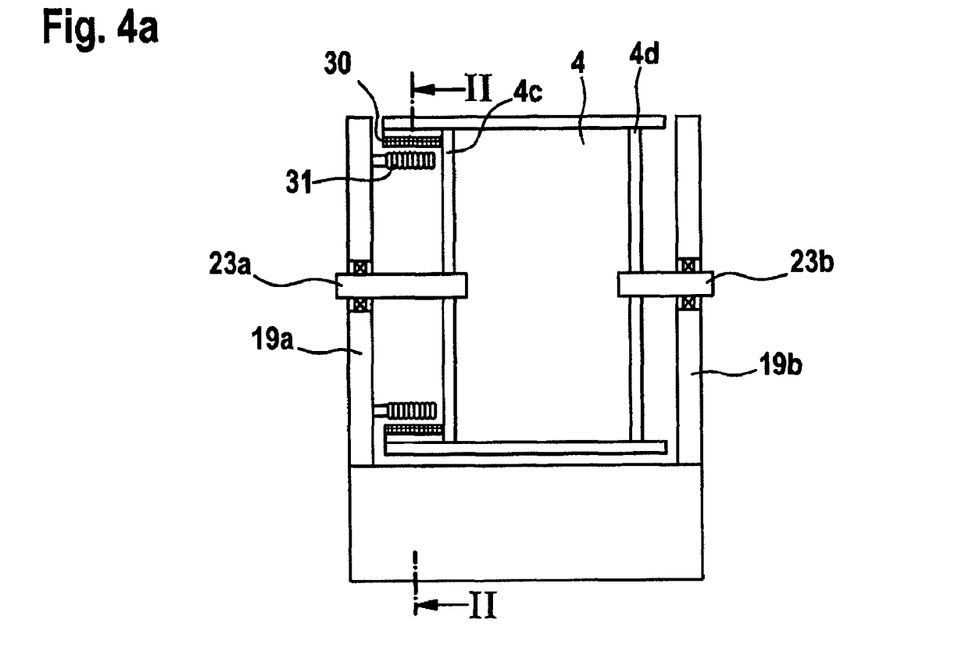
FIG. 4a shows a side panel as stator and the cylinder as rotor, with the permanent magnets and the coils lying opposite to one another parallel to the axis.
Figure 4B:
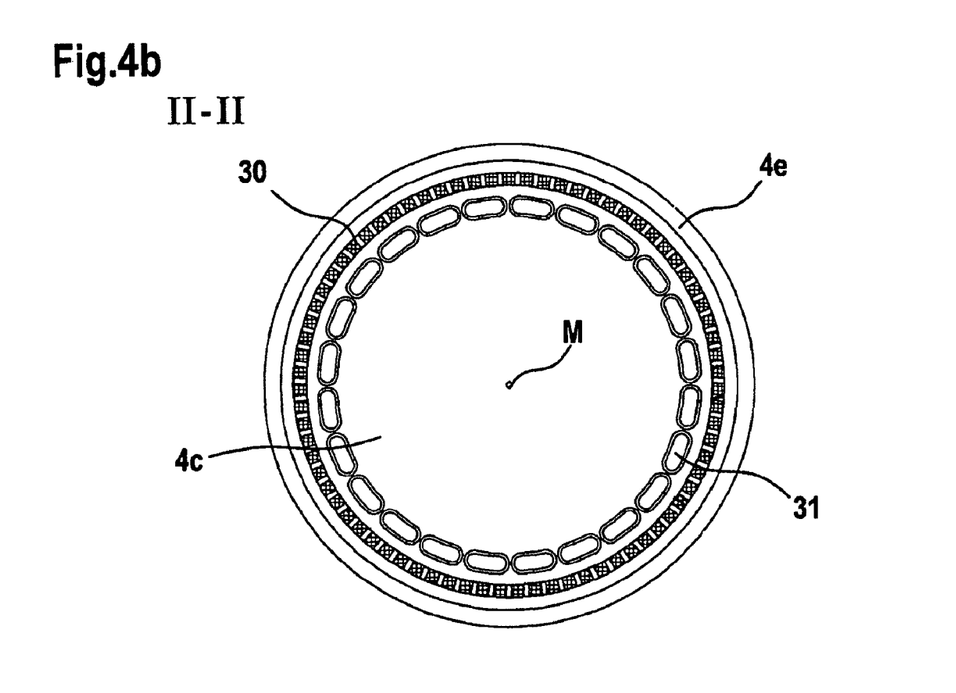

In the embodiment of FIGS. 4a, 4b, a plurality of permanent magnets 30 are arranged in a side region of the rotating cylinder 4 and a plurality of electromagnetic coils 31 are arranged in a side region of an immobile side panel 19a. The permanent magnets 30 and the coils 31 lie opposite to one another, and extend parallel to the axis of the cylinder 4. The electromagnetic coils 31 are connected to an electric current supply (see FIG. 8). In that way, the side panel together with the coils 31 form the stator and the cylinder 4 together with the permanent magnets 30 form the rotor of the electromotive drive means.

Figure 5:
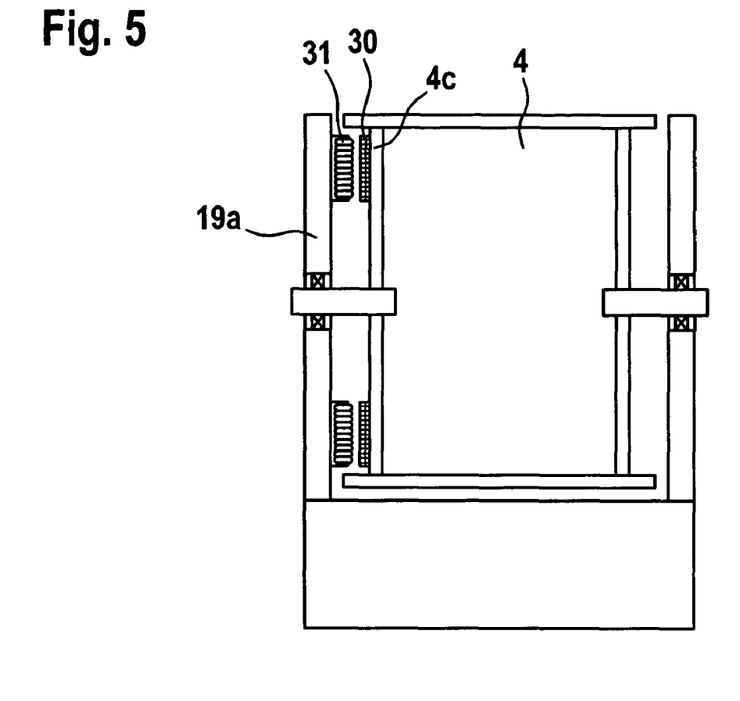
FIG. 5 shows a side panel as stator and the cylinder as rotor, with the permanent magnets and the coils lying opposite to one another, extending radially.

FIG. 5 shows a further possible embodiment of the drive according to the invention. In that arrangement, the permanent magnets 30 are mounted on the side wall 4c of the cylinder. The coils 31 are arranged on the side panel 19a— displaced by 90° in relation to an arrangement according to FIGS. 4a, 4b.

The permanent magnets 30 and the coils 31 lie opposite to one another, and extend in the radial direction.

Figure 6:
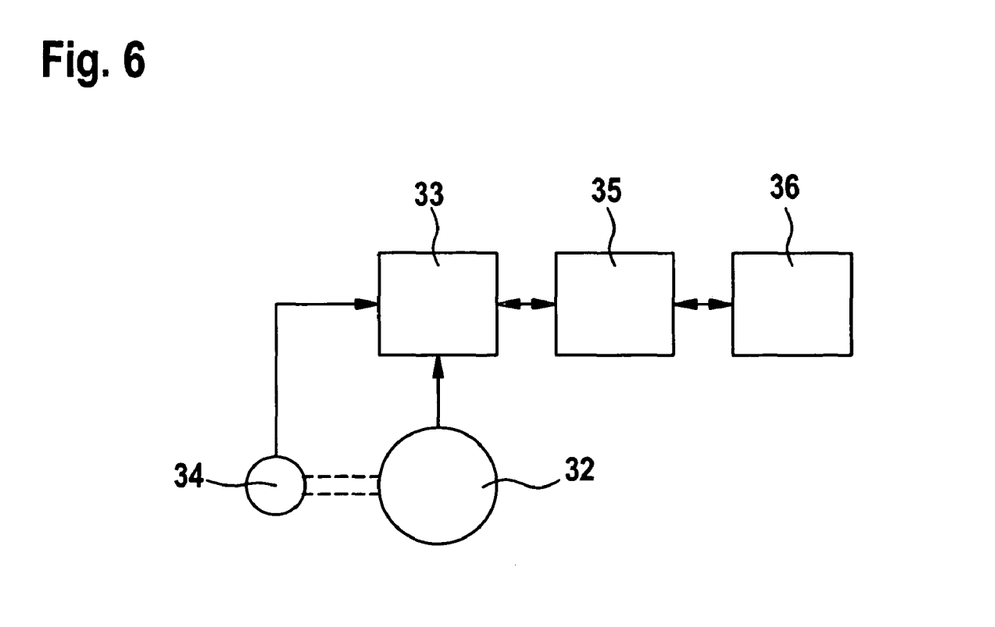
FIG. 6 shows a controlling and regulating device for controlling the electromotive drive means.
Figure 7:
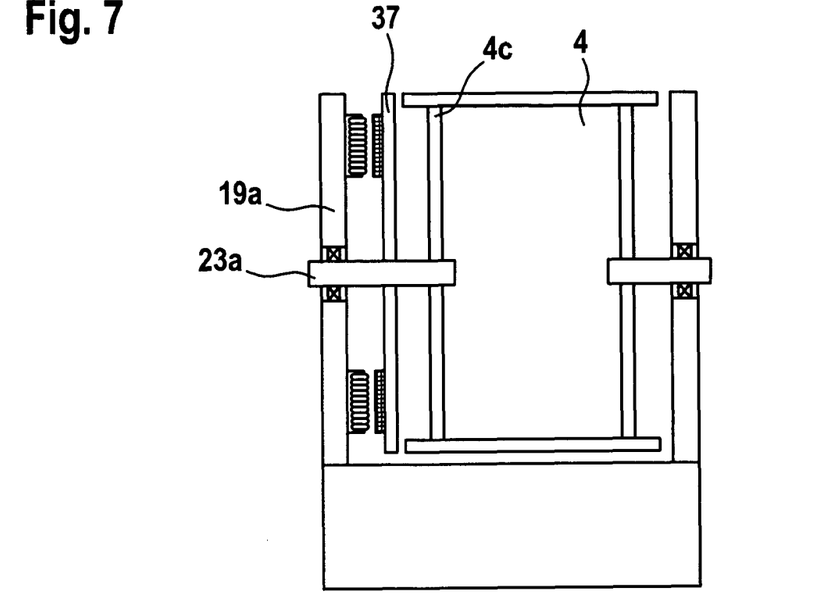
FIG. 7 shows a side panel as stator, and a plate or the like, in lateral association with the cylinder, as rotor.

FIG. 6 shows an advantageous control system configuration for a drive according to the invention. The control of the electromagnetic drive means 32 is effected by a controlling and/or regulating device 33, for example a frequency converter. Reference numeral 34 denotes a transmitter system, reference numeral 35 a control system and reference numeral 36 an operator and display device FIG. 7 shows an embodiment similar to that of FIG. 5 having a side panel 19a together with coils 31 as stator, but in which a rotating plate 37, which is in lateral association with the cylinder 4, with permanent magnets 30 is present as rotor. The plate 37 is mounted on the shaft journal 23a for conjoint rotation therewith.

The plate 37 can also be joined (in a manner not shown) to the cylinder side-wall 4c.

Figure 8:
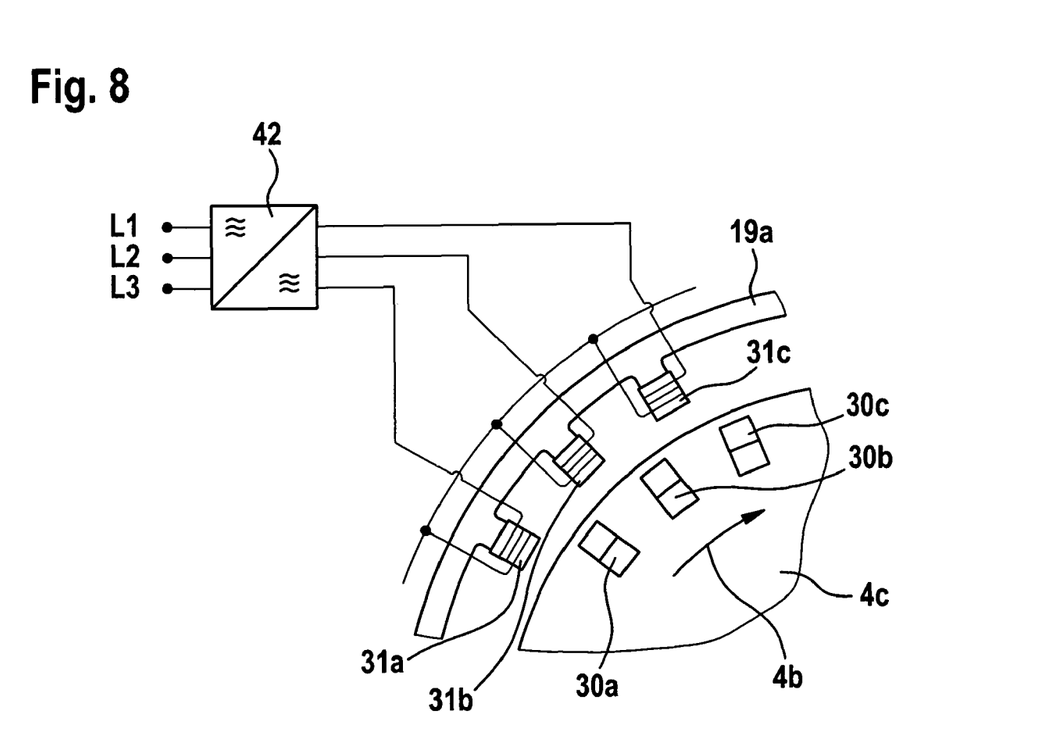
FIG. 8 shows a portion of an arrangement having permanent magnets located inside and coils located outside and connection of the coils to a rotary current supply.

In the arrangement shown in FIG. 8, a rotary current line is provided with a star-connected three-phase system. The coils 31a to 31c are connected by way of a converter 42 to a rotary current supply (phases L1, L2, L3). The coils 31a to 31c (and all other coils) are attached to the side panel 19a, for example, by bonding or the like. The permanent magnets 30a to 30c (and all other permanent magnets) are attached to the side panel 4c, for example, by bonding or the like. As a result of the fact that the three independent currents are conducted into each of the three immobile field coils and the permanent magnets are attached to one axis, the cylinder 4 is caused to rotate by way of the permanent magnets (see arrow 4b). As a result of the three phase-shifted alternating currents, a resulting magnetic field (rotary field) is formed which rotates between the coils with the frequency of the alternating current. The three-phase current generating the rotary field is a rotary current.

Figure 9A:
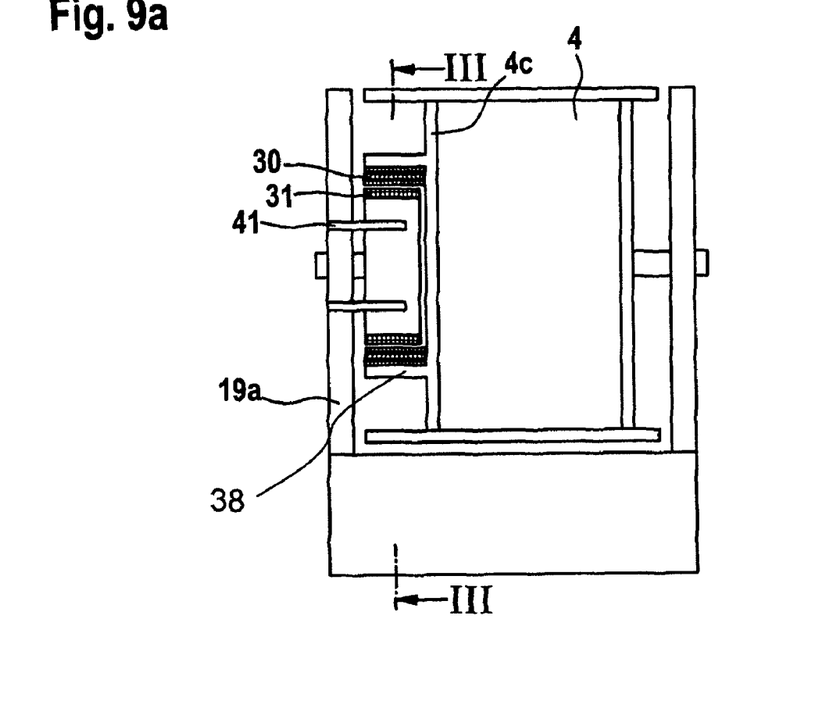
FIG. 9a shows an embodiment with a housing each around the rotor and the stator.
Figure 9B:
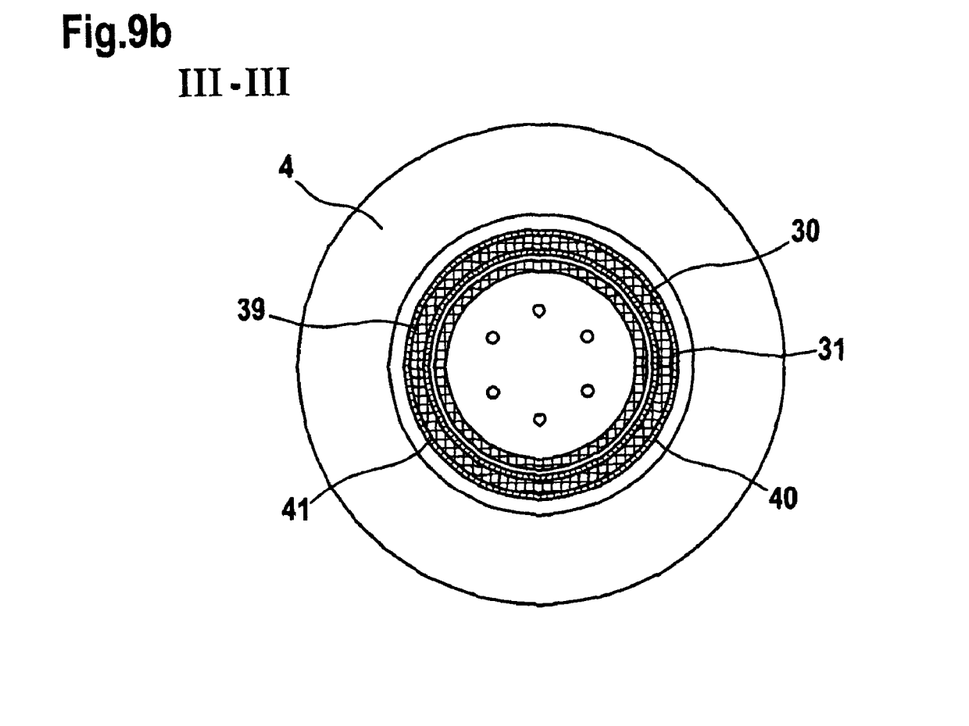

According to FIGS. 9a, 9b, the housing 38 of the rotor, in which permanent magnets 30a to 30n are located over the whole of the circumference, is fixedly connected to the cylinder 4. The stator with the electric coils 31 and the connections thereof are fixedly mounted at the side panel 19a. Between the rotor and the stator there is a small clearance 40. Reference numeral 39 denotes the housing of the stator and reference numeral 41 denotes fastening elements.

According to one embodiment of the invention, the motor 32 driving the cylinder 4 is integrated directly into the side panel 19a of the cylinder 4 and into the cylinder 4 itself. In that arrangement, the stationary side panel 19a constitutes, inter alia, the stator and the cylinder 4 constitutes the rotor of the drive motor (FIGS. 4a, 4b, 5).

The motor function is effected by permanent magnets 30 being mounted on the inside in the edge region of the cylinder casing 4, by coil bodies 31, on which coils have been wound, being attached to the side panel 19a, and by all of those coils being connected to one another according to particular rules and then being connected to a suitable control system. The control system drives a current through the individual coils in such a manner that a rotary field is obtained which causes the cylinder 4 to rotate about its axis M.

Since the drive according to the invention is directly integrated into the machine elements already present, no additional space is required.

If required, the drive can be installed on both sides of the cylinder 4. The drive is controlled by a regulating and controlling device 33, for example a frequency converter. The regulating and controlling device 33 is so formed that it is able both to control the speed of the cylinder 4 and to reduce the speed of the cylinder again in the desired manner by braking. The cylinder 4 is fitted with a transmitter system 34 which is able to transmit to the regulating and controlling device 33 data concerning the current position and speed of the cylinder 4.

According to the arrangements described, the cylinder (FIGS. 4a, 4b, 5) may, or with the aid of a plate (FIG. 6) joined to the cylinder 4 may, have a plurality of permanent magnets, which form the rotor of the motor. In another variant, a rotor carrying the permanent magnets is joined directly to the cylinder 4.

Advantageously, a plurality of electric coils are attached to the side panel 19a over the whole of the circumference of the cylinder 4.

According to a further development, a stator carrying the coils is joined directly to the side panel of the cylinder 4.

The drive means according to the invention can advantageously be altered in its speed or provided with speed control in a very simple manner by means of a frequency converter. Means that render possible a mechanical change in position of the stator in order to change the speed are not required.

In the embodiment of FIG. 9, permanent magnets are located outside and coils inside. With the same mode of operation, the drive can in principle also be constructed the other way round, that is to say, with the rotor with the permanent magnets located inside and with the stator with the coils outside (see FIG. 8).

Although the foregoing invention has been described in detail by way of illustration and example for purposes of understanding, it will be obvious that changes and modifications may be practiced within the scope of the appended claims.

What is claimed is:

1. An apparatus at a spinning preparation machine, comprising:
at least one electrically-driven roller and at least one immobile machine element adapted to associate with the at least one roller, wherein one of the at least one roller and the at least one immobile machine element comprises a rotor of a electric drive motor and the other of the at least one roller and the at least one immobile machine element comprises a stator of the electric drive motor, wherein the rotor is adapted to mount at least one permanent magnet and the stator is adapted to mount electromagnetic coils, and wherein an alternating current is applied to the electromagnetic coils to drive the at least one roller by a resulting rotary field.

2. An apparatus according to claim 1, wherein the rotor is integrated into the at least one roller and the stator is integrated into the at least one immobile machine element.

3. An apparatus according to claim 1, wherein the stator is integrated into the at least one roller and the rotor is integrated into the at least one immobile machine element.

4. An apparatus according to claim 1, wherein the at least one immobile machine element is a side panel.

5. An apparatus at a spinning preparation machine having at least one electrically-driven roller, at least one stationary side panel associated with the at least one roller, and an electric drive motor for driving the at least one roller, wherein the electric drive motor comprises a rotor joined directly to the at least one roller and a stator joined directly to the at least one stationary side panel, and wherein when an alternating current is applied to the stator the at least one roller is driven by a resulting rotary field.

6. An apparatus according to claim 1, wherein the electric drive motor is integrated in part into the at least one roller to be driven and in part into the at least one immobile machine element.

7. An apparatus according to claim 1, wherein the electric drive motor comprises:
a plate, which is joined to the at least one roller to be driven or to a shaft thereof and on which there are mounted permanent magnets of the motor; and the at least one immobile machine element, which carries the at least one roller and on which electric coils are fastened.

8. An apparatus according to claim 1, wherein the at least one roller has a roller casing and magnets belonging to the electric drive motor are mounted on the inside of the roller casing.

9. An apparatus according to claim 1, wherein the at least one roller has at least one end wall and magnets belonging to the electric drive motor are mounted at the at least one end wall of the at least one roller.

10. An apparatus according to claim 1, wherein the electromagnetic coils belonging to the electric drive motor are mounted at a side panel upon which a working component bears.

11. An apparatus according to claim 1, further comprising a frequency converter to operate the electric drive motor.

12. An apparatus according to claim 1, wherein the electric drive motor is operable as an electromotive braking device.

13. An apparatus according to claim 12, wherein at least one of the electric drive motor or the braking device is integrated into rotating components of the at least one roller and into the at least one immobile machine frame.

14. An apparatus according to claim 1, wherein the spinning preparation machine is a carding machine, wherein the rotor of the electric drive motor is joined directly to the at least one roller, and wherein the stator of the electric drive motor is joined directly to an immobile side panel of the carding machine.

15. An apparatus according to claim 1, further comprising a linear motor, wherein the electric drive motor and the linear motor each have a stator and a rotor.

16. An apparatus according to claim 1, wherein the at least one permanent magnet comprises a plurality of permanent magnets.

17. An apparatus according to claim 1, wherein a rotary field can be generated in the electromagnetic coils for the purpose of reducing speed by braking.

18. A method of driving a roller of a spinning preparation machine comprising: constructing a rotor integrated into one of said roller and an immobile machine element associated with said roller; constructing a stator integrated into the other of said roller and said immobile machine element; and supplying an alternating electrical current to said rotor and/or stator for driving the roller by a resulting rotary field.

* * * * *